ABSTRACT

United States Patent [19]
Stark et al.

[11] 4,014,030
[45] Mar. 22, 1977

[54] HALF-TONE IMAGING WITH FLYING SPOT SCANNER SYSTEM

[75] Inventors: Howard M. Stark, Webster, N.Y.; William Streifer, Palo Alto, Calif.

[73] Assignee: Xerox Corporation, Stamford, Conn.

[22] Filed: Feb. 23, 1976

[21] Appl. No.: 660,092

[52] U.S. Cl. .............................. 346/160; 358/285; 358/302

[51] Int. Cl.² ...................................... G03G 15/30

[58] Field of Search .................... 178/6.6 A, 6.7 R; 346/74 ES, 74 P

[56] References Cited
UNITED STATES PATENTS

| | | | |
|---|---|---|---|
| 3,830,967 | 8/1974 | Long | 178/6.6 A |
| 3,857,635 | 12/1974 | Niehaus | 178/6.7 R |

*Primary Examiner*—Howard W. Britton
*Attorney, Agent, or Firm*—M. J. Colitz; T. J. Anderson; L. Zalman

[57] ABSTRACT

Half-tone imaging is achieved in a flying spot scanning system wherein a highly collimated light beam is modulated with imaging information, reflected from a multifaceted rotating polygon and directed to a scanned medium through a light attenuating member. The latter member is supported proximate the imaging focal plane and orthogonal to the collimated, reflected light beam. The light attenuating member has an optical light transmission characteristic that varies in a continuous and cyclic pattern with a cycle period at least about ten times the maximum lateral extent of the collimated light beam, thereby serving to alter the system imaging from contrasting black and white patterns to half tones and gray colorations.

11 Claims, 5 Drawing Figures

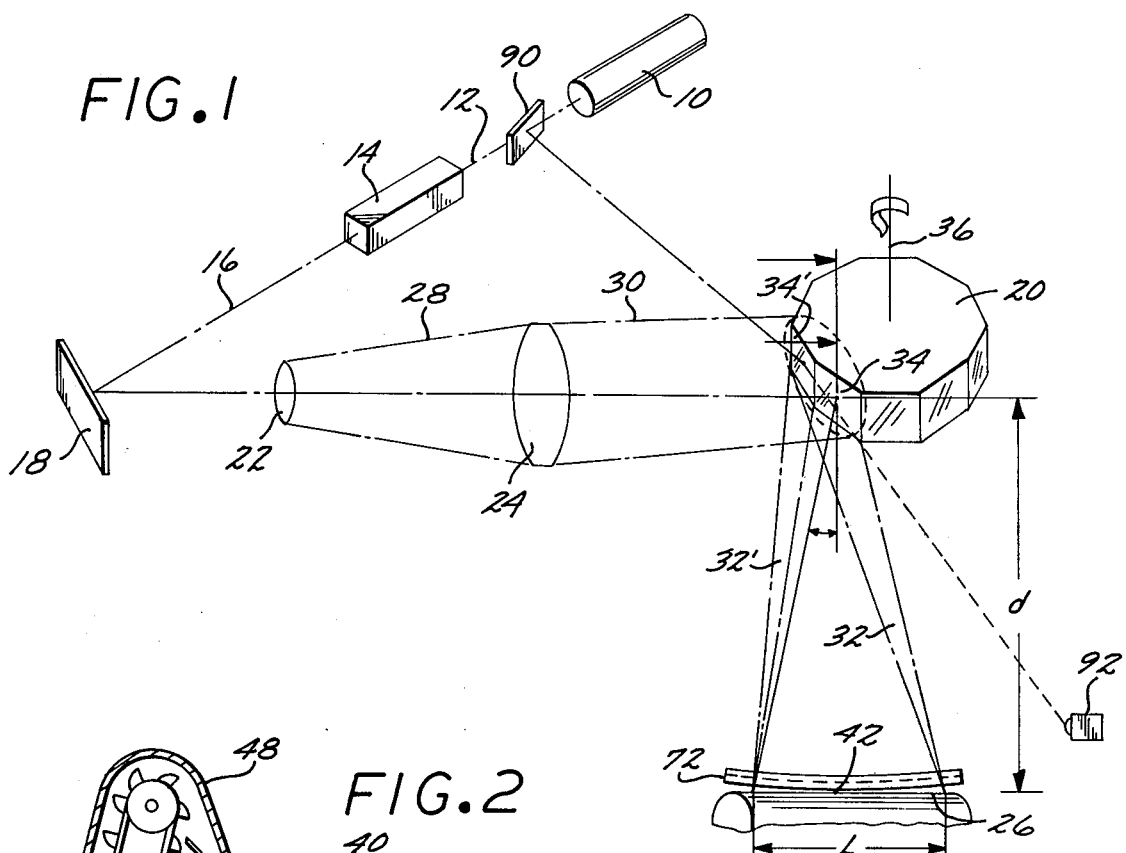
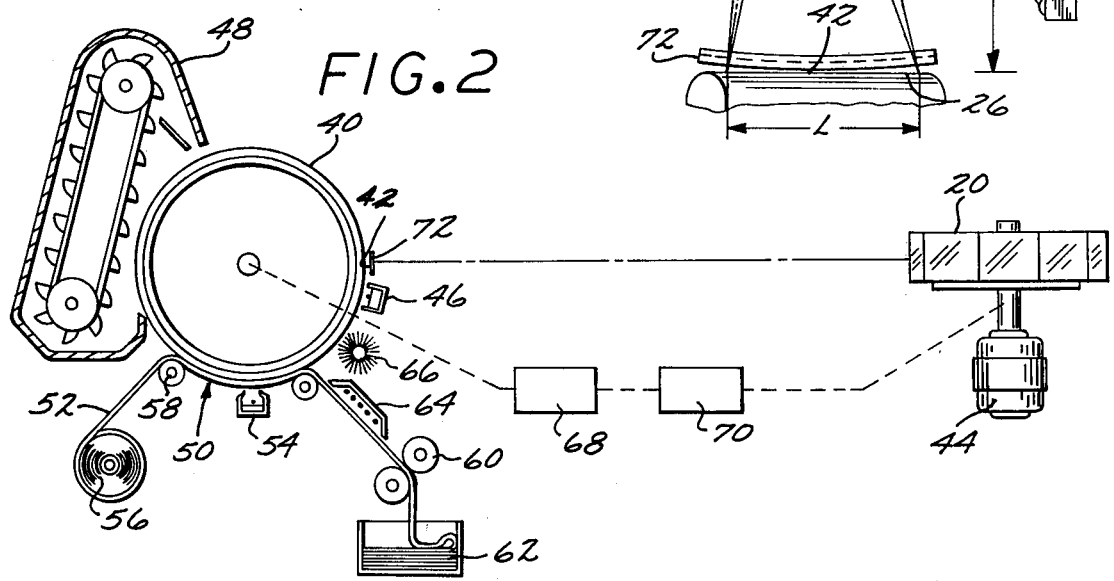
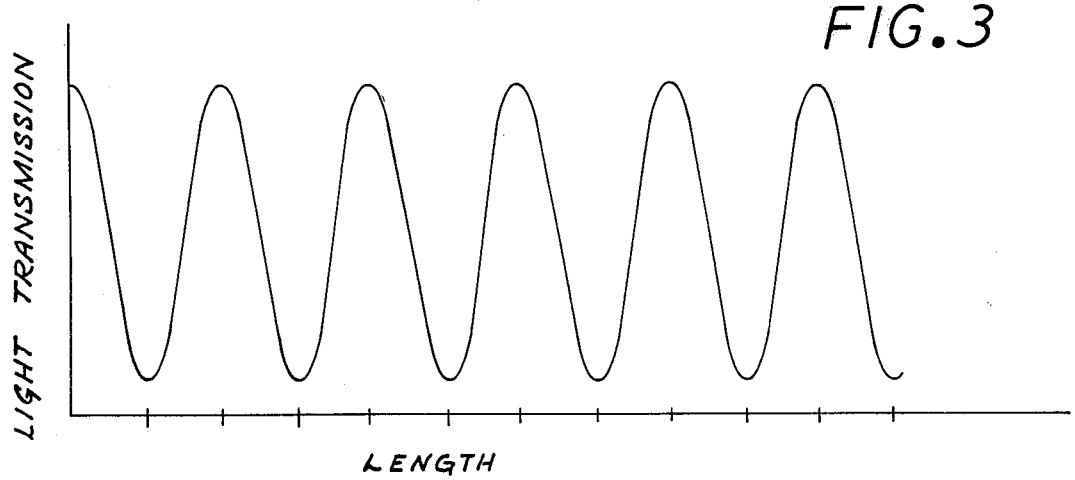

HALF-TONE IMAGING WITH FLYING SPOT SCANNER SYSTEM

BACKGROUND OF THE INVENTION

1. Field of the Invention

This invention relates to a flying spot scanning system which modulates and reflects highly collimated light onto a scanned medium and, in particular, to an improvement for achieving half-tone imaging in the system.

2. Brief Description of the Prior Art:

Recent developments in the optical imaging of information have included the flying spot scanning system in which a collimated light beam is modulated in response to input video information and reflected by a mirror surface such as an oscillating galvanometer mirror or a multifaceted, rotating polygon. The reflecting surface is driven in a timed manner to sweep the reflected light beam in a scan across a focal plane imaging surface for an optical readout of the input information. The modulating facilities employed in these flying spot scanning systems modulate the intensity of the light beam in response to an analog video signal.

The flying spot scanning system has been applied to information reproduction systems such as xerography by positioning the focal plane readout surface adjacent the photoreceptive surface of a xerographic drum. The reflecting mirror or polygon is oscillated or rotated in a timed manner with the rotation of the xerographic drum to provide a series of continual scans of reflected and information-modulated light beams across the surface of the rotating xerographic drum. The limitation of the xerographic system, has heretofore precluded the reproduction of continuous tone images because of its inability to accurately and consistently produce continuous image tones other than black and white.

It is an object of this invention to provide a flying spot scanning system capable of creating half-tone images in a high contrast image reproducing system such as xerography.

Other objects will be apparent from the following description of the invention.

SUMMARY OF THE INVENTION

This invention provides for half-tone creation in a flying spot scanning system wherein a highly collimated light beam is modulated with video information, reflected and directed to a scanned medium such as a focal plane imaging surface through a light attenuating member. This member has an optical light transmission characteristic which varies in a continuous and cyclic pattern with a cycle period at least about 10 times the maximum lateral extent of the collimated light beam. The light attenuating member is positioned proximate but out of contact with the scanned medium and orthogonal to the collimated light beam. The cycle period of the light attenuating member should be sufficiently great to provide half-tone imaging invisible to unaided vision, typically from 100 to about 200 cycles per inch. A typical light attenuating member which can be used herein is a soft line screen such as used in printing processes. The preferred source of the collimated light beam is a laser that generates a collimated beam of monochromatic light although, if desired, other sources of similarly collimated light can be used.

A significant feature of the present invention is that the light attenuating member is supported at a spaced position from the imaging focal plane such as the photoreceptive surface of a rotating xerographic drum or belt, or other light sensitive imaging medium such as film, thereby avoiding any interference with the xerography process and system.

Because the light beam used in the flying spot scanning system is highly collimated, the light attenuating member can be placed a discrete distance from the imaging focal plane and sharply defined images can, nevertheless, be achieved on the focal plane. This is in contrast to normal visual light imaging processes commonly used in printing processes which employ focused light systems having highly divergent or convergent light beams and which, therefore, require that the soft line screen be in direct contact with the photoreceptive surface.

In the preferred embodiment, the collimated light beam is employed having a relatively confined lateral extent with substantial absence of any divergent or convergent beams. This permits the light attenuating member to be in the form of a flat planar surface bearing a continuous and cyclic pattern of light transmission characteristic. The light attenuating member is positioned orthogonal to the collimated light beam. If desired, however, light sources of lesser collimation can be employed in combination with light attenuating members having continuous and cyclic patterns which compensate for the lack of collimation in the light beam. Additionally, the light attenuating member can be in an arcuate path with its radius of curvature approximately the divergent angles of the light beam, thereby maintaining its surface orthogonal to the light beam.

DESCRIPTION OF THE DRAWINGS

The invention will be described with reference to the illustrated and presently preferred embodiments shown in the figures of which:

FIG. 1 is a perspective view of a flying spot scanning system used in the invention;

FIG. 2 is an elevation view of the system shown in FIG. 1;

FIG. 3 is a graph of the light transmission characteristic of the light attenuating member as a function of its spacing.

Referring now to FIG. 1, the flying spot scanning system which is the subject matter of the present invention is illustrated with a light source 10 that provides a highly collimated beam of light 12 having a limited lateral extent. While various light sources can be used it is preferred that light source 10 be a laser that generates a highly collimated beam of monochromatic light for subsequent processing. Various commercially available lasers can be employed for this purpose including the ruby laser, the helium-neon lasers, helium-cadmium lasers, carbon dioxide lasers, or semi-conductor lasers such as gallium-arsenide, indium-arsenide or indium-phosphide lasers.

Figure 4:
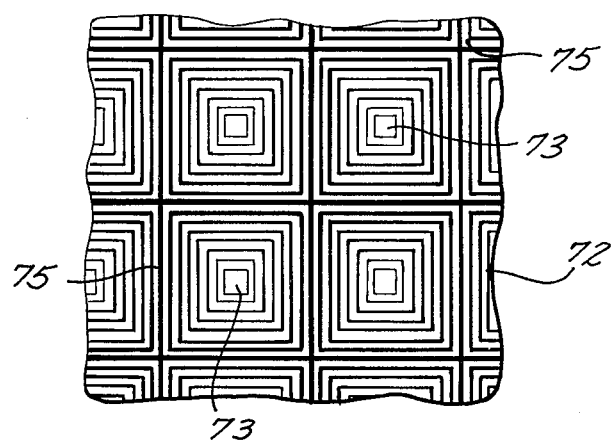
FIGS. 4 and 5 are views of suitable light attenuating members.

The aforementioned lasers are capable of generating monochromatic light beams which are highly collimated and which have a very limited lateral extent, typically with beam widths, as measured between the extremities of the beam where the intensity is 1/10 of the light intensity at the beam center, which range from 5 to about 50, commonly from 10 to about 25 microns.

The highly collimated light beam 12 is directed through modulator 14 which can be any suitable electro-optical or acousto-optical device for receiving video input information in the form of electrical signals and for modulating the light beam 12 in response thereto. Typical modulators that can be used include a Pockel's cell that utilizes a light transmitting crystal having a variable index of refraction which is responsive to applied voltage, e.g., a potassium dihydrogen phosphate crystal. The video signal input to this modulator can, therefore, comprise an unidirectional signal of varying voltage that is an analog of the image being transmitted. The modulator 14 is thereby effective in either permitting passage of light beam 12 along its projected axis from the laser 10 or in varying the light intensity along its projected axis in response to input electrical signals.

Light beam 12, as modulated through the electro-optical modulator 14, is directed as a modulated, collimated light beam 16 onto a reflective surface such as mirror 18 which is used to fold the light path and direct the beam 16 towards the multifaceted polygon 20. The reflected and modulated light beam 16 can be passed directly to polygon 20 or, if desired, can be focused by lens means such as 22 and 24 which insure that the light beam is received on the scanned medium at focal plane 26 with an uniform spot size. A complete description of a suitable lens system can be found in U.S. Pat. No. 3,867,571 of Feb. 18, 1975. Briefly, the lens system can include doublet lens 22 to image a virtual or real axial point of light beam 16 through a focal point to provide a real image in the direction of the polygon 20. At the focal point the light beam 16 diverges to form beam 28. Light beam 28 is received by imaging lens 24 having a sufficient diameter to receive the expanded light beam and render a convergent beam 30 which illuminates the desired facets of polygon 20 to reflet light beams 32 into focus on focal plane 24 that is located at a predetermined, fixed distance $d$ from the polygon 20.

Polygon 20 is a multisided body bearing a plurality of mirror surfaces or facets 34. The polygon is supported on a rotational axis 36 and is driven by drive means capable of spinning the polygon at relatively high rotational speeds, e.g., from 10,000 to about 30,000 revolutions per minute (rpm), preferably from 15,000 to 25,000 rpm. Light incident on the mirrored surfaces or facets 34 is reflected therefrom in the form of well-defined light beams 32 which sweep across length L of focal plane 26 at a velocity determined by the rotational speed of polygon 20 and also the distance $d$. In the illustrated embodiment, the light beam 30 is incident on two facets 34 and 34', creating the reflected light beams 32 and 32' which are received on focal plane 26 as points or spots of light which scan across the surface of the focal plane 26 in response to the rotational speed of polygon 20.

The flying spot scanning system has been described with reference to the preferred use of polygon 20. It is recognized, however, that other devices such as mirrored piezoelectric crystals or planar reflecting mirrors driven in an oscillatory fashion could also be employed.

The focal plane 26 provides a visual readout surface for the modulated and reflected light beam. The focal plane is proximate a recording medium 40 having a photoreceptor surface of a photosensitive material such as a photographic film or the surface of a xerographic element such as drum or belt to provide a recording surface 42 which is swept by the scanning spots of light from light beams 32 and 32'.

Referring now to FIG. 2, the polygon 20 is shown with drive means such as motor 44 which is driven in a timed manner with the rotating recording medium 40 which is in the form of a xerographic drum. The recording facilities are of conventional xerography structure with drum 40 that rotates consecutively through a charging station having a corona charging device 46 and exposure surface 42 which receives the focused spots of light from light beams 32 and 32' as they are directed in sweeps across the surface by rotating polygon 20. The facilities also include a conventional developing station 48, depicted by a cascade or magnetic brush development enclosure, and transfer station 50 where a web of copy paper 52 is passed into contact with the drum 40 and receives an electrostatic discharge from corona discharge 54 to induce transfer of the developed image from drum 40 to the copy paper 52. The copy paper, which is supplied from reel 56 or a tray, passes around guide rollers 58 and through drive rollers 60 into receiving bins 62. A thermal device 64 fuses the tone to the copy paper as the paper passes to bin 62.

The video information encoded in the electrical signal applied to modulator 14 is carried in modulated or variant intensities of light in light beams 32 and 32' in response to the positions of the light beams in the scan of the beams across the surface of the focal plane 26. As the light spot scans across focal plane 26 it dissipates the electrostatic charge on xerographic drum 40 in accordance with the light intensity of the spot. This results in an electrostatic charge pattern being produced in each sweep of the light beam across the surface of the drum 40.

The drum 40 is driven at a constant speed by motor 68 which is timed by control means 70 with the drive motor 44 of polygon 20 to provide a series of continuous scans traversely across the surface of drum 40 which overlap slightly to provide a continuous pattern developed across the entire circular surface of drum 40. The electrostatic charge pattern thus produced is developed in developing station 28 and transferred to the final copy paper. The drum 40 is cleansed by a cleaning device such as the rotating brush 64 before the drum surface rotates into the charging station 46.

The invention as applied to the flying spot scanning system thus described is in the form of a light attenuating member 72 which is positioned in proximity to the photoreceptive surface of xerographic drum 40. This member is an element having an orderly and varied light transmission characteristic. The light transmission characteristic preferably varies in a continuous and cyclic pattern with a cycle period which is at least about 10 times the maximum lateral extent of the light beam 32 and 32'.

A graphical depiction of the light transmission characteristic of the member as a function of its length across the surface of drum 40 appears as FIG. 3. This light transmission coefficient varies from a high value, approaching that of complete light transmission for an entirely transparent portion of screen 72, to a limited light transmission approaching that of complete opacity and this variation follows a regular pattern across the screen.

FIG. 4 depicts the variable opacity of the member 72, which for simplicity of illustration comprises a series of rulings with varied spacing. In practice, the varied opacity would not have distinct contrasts but would be of a continuously varying gray to black appearance. The depiction does, however, illustrate the areas 73 of complete transparency and alternating areas 75 substantially complete opacity with zones of intermediate light transmission values therebetween. Typically, the member should provide from 75 to about 200 periods per inch, preferably from about 100 to about 150 periods per inch, to achieve a half-tone imaging on the printed paper that will be void of any readily discernable spotting. This requirement is compatible with the collimation capability of laser light sources which typically have maximum lateral extents of their collimated monochromatic light which vary from 5 to about 50, preferably from 10 to about 25, microns.

The light attenuating member can be a photographic film having developed thereon the desired pattern of transparent and variably opaque areas. Typical of such materials which are commercially available as soft line screens for the printing industry include the gray contact screens which are commercially available from the Eastman Kodak Company, Rochester, New York, or the gray straight line contact screens available in cycle periods from 50 to 150 lines per inch from the Caprock Developments Inc., Norris Plains, New Jersey. These screens can, optionally, be coated with various antireflection coatings to avoid any light reflections at the interface between the screen and the air which would distort or diminish the light transmission to the photo-receptive surface of drum 40.

Figure 5:
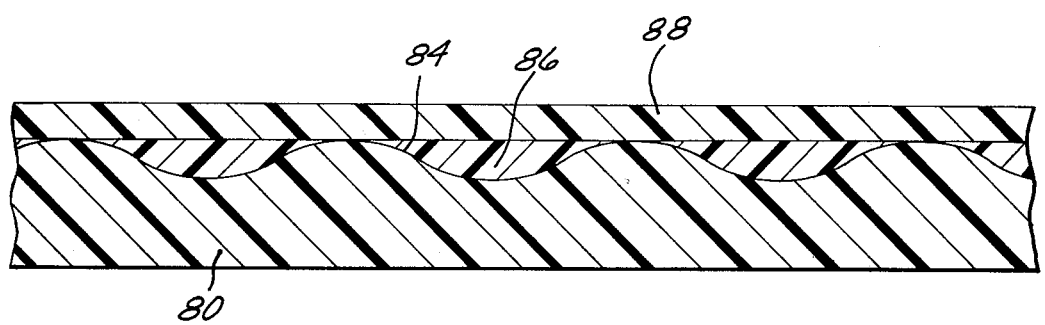

FIG. 5 illustrates a construction that can be used for a suitable light attenuating member. This construction comprises a plastic film 80 of substantially complete light transparency having at least one surface 84 which is corrugated in the illustrated manner. The cycle period for the corrugations correspond to the desired period of cyclic variation of light transmission and opacity of the film. The corrugated plastic is covered with an absorptive dye 86 which fills in the valleys between the corrugations in the illustrated manner. The film 80, coated with the absorptive dye, is then covered with a film 88 which can be a clear plastic or glass film of substantially complete light transmission.

Member 72 is maintained orthogonal to the incident light beams 32 and 32'. If desired, this member can be bowed slightly in an arcuate path as shown in FIG. 1 along the radius of curvature corresponding to the paths of light beams 32 and 32' in the sweep of these light beams across the surface of drum 40. Additionally, the frequency of the cycle period of light transmission and opacity in the light attenuating member 72 can be varied along its length in a manner to compensate for the slight variation in light transmission that will occur because of the convergence of light beams 32 and 32' as these beams are focused to near point intensities on drum 40.

The remainder of the flying spot scanning system can be of the conventional construction or, preferably, of the construction described in the aforementioned prior U.S. patent. This construction includes a specific synchronization technique which can be employed with the optical elements 22 and 24 to avoid any variation in spot velocity that could otherwise result from convolution of the optical elements. Reference is made to U.S. Pat. No. 3,867,571, which is incorporated herein by reference for a disclosure of the synchronization scheme that can be employed for this purpose.

The flying spot scanning system can also include edge discrimination facilities. To this end, the system includes a beam splitter 90 which directs a portion of the light from laser 10 to a detector circuit that is incorporated in a detector 92 to detect the start of a scan. This detector circuit and control is described in greater detail in the aforementioned U.S. Pat. No. 3,867,571, which is incorporated herein by reference for the description of the edge discrimination circuit to provide reliable timing of the start of the scan with the commencement of information flow from the video signal. The detection of the precise start of scan gives a precise definition of the gating pulse out which measures the length of the characters of information to be recorded on the drum 40 in each scan line. The leading edge of the output of the detector circuit is thus critical in aligning the sending of information in the form of a video signal to the start of each scan. At the end of the pulse, the end of each scan is indicated. With the start of the next scan the control circuit is reset to provide another timing pulse.

The invention has been described with reference to the illustrated and presently preferred embodiments. It is not intended that the invention be unduly limited by the illustrated embodiments. Instead, it is intended that the invention be defined by the means, and their obvious equivalents set forth in the following claims.

What is claimed is:

1. A method for imparting half-tone imaging capability to a flying spot scanning system wherein a collimated light beam is modulated in response to a video electrical signal and reflected as a plurality of beams of modulated light sweeping across a photosensitive surface which comprises:
   positioning proximate the photoreceptor surface but out of contact therewith a light attenuating member having an optional light transmission characteristic that varies in a continuous and cyclic pattern with a cycle period of at least about 10 times the maximum lateral extent of said light beam.

2. The method of claim 1 wherein said light attenuating member is positioned orthogonal to said light beam.

3. The method of claim 1 wherein said photosensitive surface is the photoreceptive surface of a xerographic recording device.

4. The method of claim 3 wherein said light beam is reflected by rotating a multifaceted polygon about an axis orthogonal to said light beam to rotate mirrored sides of said multifaceted polygon into reflecting positions incident to said light beam or other means of deflecting said light beam and to direct reflected light therefrom onto said photo-receptor surface.

5. The method of claim 4 wherein said xerographic recording device is a drum that is rotated in a timed relationship with the rotation of said polygon.

6. The method of claim 5 wherein said light beam is modulated in response to a video electrical signal that modulates the intensity of said light beam in response to video information encoded in said electrical signal.

7. A flying spot scanning system which comprises
   a light source for generating a highly collimated light beam having a lateral extent from 5 to about 50 microns;
   an electro-optical modulator to receive input video electrical signals and to modulate the intensity of the collimated light beam in response thereto;
   a photo-receptor surface for recording the intensity of incident light thereon;

moving mirror means positioned in the path of the modulated light beam and operative to reflect said light beam as a plurality of moving bands of light and to direct said moving bands of light in a scanning path across the surface of said photo-receptor; and a light attenuating member positioned in the path of the moving beams of light reflected from said moving mirror means and bearing areas of light transmission and variable light opacity in a pattern thereon in a continuous and cyclic period with the frequency of the cycle period being at least 10 times the maximum lateral extent of said modulated light beam.

8. The flying spot scanning system of claim 7 wherein said moving mirror means comprises a multifaceted polygon bearing mirror means at each side surface.

9. The system of claim 8 wherein said multifaceted polygon is connected to a drive means capable of rotating said polygon at rotational speeds 10,000 to about 30,000 revolutions per minute.

10. The system of claim 8 wherein said light attenuating member comprises a photographic film having developed thereon areas of varied light opacity.

11. The flying spot scanning system of claim 7 wherein said soft line screen is formed of a plastic film having a corrugated surface and bearing an optically absorbing dye filled in the valleys of the corrugation surface and covered with a protective, optically clear layer.

* * * * *